(12) United States Patent
Zhou

(10) Patent No.: US 9,173,075 B2
(45) Date of Patent: Oct. 27, 2015

(54) COMMUNICATION DEVICE AND MESSAGE TRANSMITTING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Jian-Jun Zhou, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 12 days.

(21) Appl. No.: 14/260,438

(22) Filed: Apr. 24, 2014

(65) Prior Publication Data

US 2014/0323097 A1 Oct. 30, 2014

(30) Foreign Application Priority Data

Apr. 26, 2013 (CN) .......................... 2013 1 0148964

(51) Int. Cl.
*H04M 1/663* (2006.01)
*H04W 4/12* (2009.01)
*G06F 3/01* (2006.01)

(52) U.S. Cl.
CPC ... *H04W 4/12* (2013.01); *G06F 3/01* (2013.01)

(58) Field of Classification Search
CPC ....................................................... H04W 4/12
USPC ........................................... 455/412.1, 412.2
See application file for complete search history.

(56) References Cited

U.S. PATENT DOCUMENTS

| 8,335,492 B2 * | 12/2012 | Rondeau ................... 455/412.2 |
| 8,494,137 B2 * | 7/2013 | Rondeau et al. ......... 379/201.02 |
| 2011/0177800 A1 * | 7/2011 | Gilson .......................... 455/417 |

* cited by examiner

*Primary Examiner* — Shahriar Behnamian
(74) *Attorney, Agent, or Firm* — Novak Druce Connolly Bove + Quigg LLP

(57) ABSTRACT

A message transmitting method of a communication device, the communication devices stores an information matching table. The information matching table includes a telephone directory column recording a plurality of predetermined telephone numbers and a message column recording a plurality of predetermined messages in advance. When an incoming call is received, whether a phone number of the incoming call is recorded in the telephone directory column of the matching information table is determined. If the phone number of the incoming call is recorded in the telephone directory column, a prompt message stored in the information matching table is determined as a prompt message to prompt a user according to the phone number of the incoming call.

12 Claims, 3 Drawing Sheets

200

| Telephone directory | Time | Message |
|---|---|---|
| 159******88 | 3-5 seconds | Please come home for dinner. |
| | 6-9 seconds | Waiting for you at the Cafe. |
| | 10-12 seconds | Cold today, please keep warm. |
| 136******66 | 3-5 seconds | I will come home late because of overtime work. |
| | 6-9 seconds | Please come to fly kites in the Park. |
| | 10-12 seconds | Raining today, Don't forget to bring an umbrella. |

201 / 202 / 203

200

201　　　　　202　　　　　203

| Telephone directory | Time | Message |
|---|---|---|
| 159*****88 | 3-5 seconds | Please come home for dinner. |
| | 6-9 seconds | Waiting for you at the Cafe. |
| | 10-12 seconds | Cold today, please keep warm. |
| 136*****66 | 3-5 seconds | I will come home late because of overtime work. |
| | 6-9 seconds | Please come to fly kites in the Park. |
| | 10-12 seconds | Raining today, Don't forget to bring an umbrella. |

FIG. 2

COMMUNICATION DEVICE AND MESSAGE TRANSMITTING METHOD

FIELD

The present disclosure relates to a communication device and a message transmitting method for a communication device.

BACKGROUND

A communication device, such as a mobile phone, is an essential communication tool. There are two general communication methods using the communication device, text message communication and voice phone call communication.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

FIG. 2 is a diagram of an information matching table according to an example embodiment of the present disclosure.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one".

Figure 1:
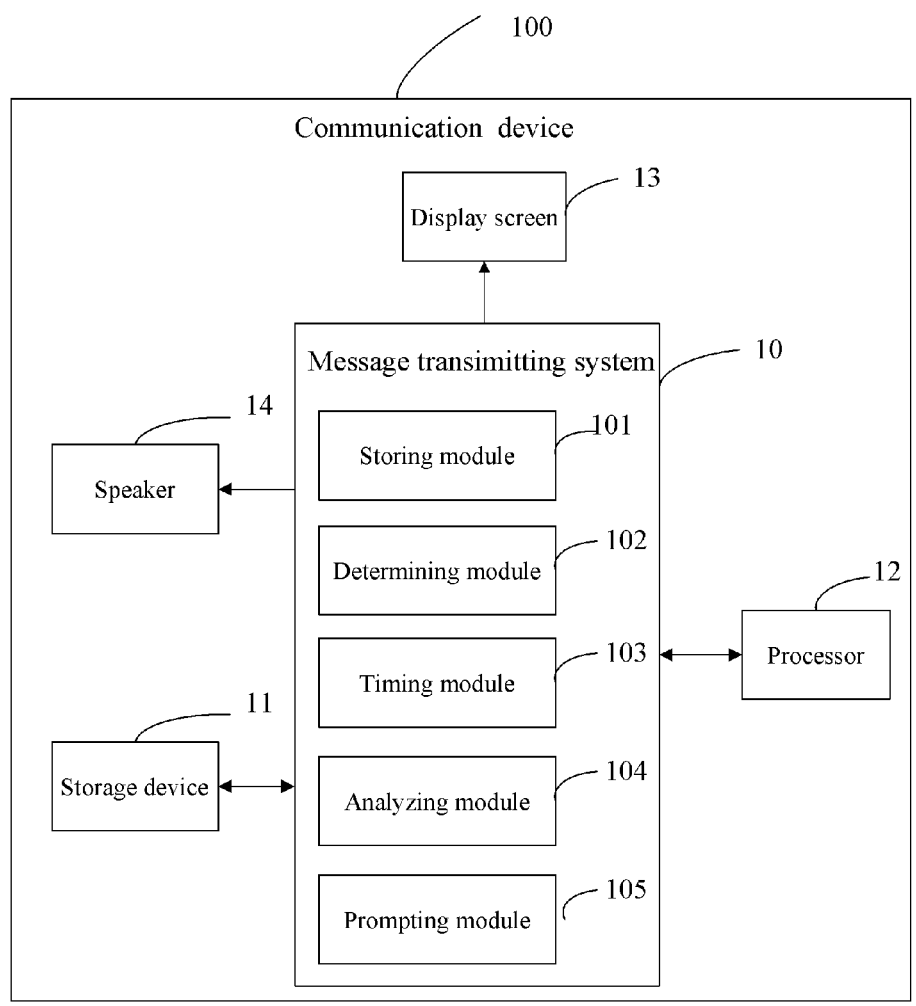
FIG. 1 is a block diagram of a communication device according to an example embodiment of the present disclosure.

FIG. 1 illustrates a block diagram of a communication device 100. The communication device 100 can be a mobile phone. In one example embodiment, the communication device 100 includes a message transmitting system 10, a storage device 11, a processor 12, a display screen 13 and a speaker 14. The transmitting system 10 can include a plurality of programs in the form of one or more computerized instruction stored in the storage device 11 and executed by the processor 12 to perform operations of the communication device 100. In one example embodiment, the message transmitting system 10 includes a storing module 101, a determining module 102, a timing module 103, an analyzing module 104 and a prompting module 105. FIG. 1 illustrates one example of the communication device 100. The communication device 100 can include more or fewer components than those illustrated in the example embodiment, or have a different configuration of the components.

The storing module 101 stores an information matching table 200. As illustrated in FIG. 2, the information matching table 200 includes a telephone directory column 201 in which a plurality of predetermined telephone numbers are recorded, a time column 202 in which a plurality of predetermined time intervals are recorded, and a message column 203 in which a plurality of predetermined messages are recorded. A corresponding relationship among the plurality of predetermined telephone number, the plurality of time intervals and the plurality of predetermined messages is established in the information matching table 200. In one example embodiment as illustrated in the FIG. 2, each predetermined telephone number corresponds to three of the plurality of time intervals. Each time interval corresponds to one of the plurality of predetermined messages. In another example embodiment, each predetermined telephone number corresponds to one of the plurality of time intervals and each time interval corresponds to one of the plurality of predetermined messages in the information matching table 200.

The telephone numbers in the telephone directory column 201 can be preset by a user. For example, the user can set the telephone numbers of his/her family, friends, customers and others in the telephone directory column 201. The predetermined time intervals can be a time length or a time range. For example, the time length can be 3 seconds, 5 seconds or 7 seconds and the time range can be 3-5 seconds, 6-9 seconds or 10-12 seconds. In another example embodiment, each of the predetermined time intervals are a time range. The predetermined messages can be preset by the user. For example, the user can ask his families, friends or customers to determine the contents of the messages in advance. In another example embodiment, except for the message column 203, additional columns can be added in, and others can be deleted from the information table 200, one message column 203 can remain.

When the communication device 100 receives an incoming call, the determining module 102 determines whether a phone number of the incoming call is recorded in the telephone directory column 201 of the information table 200. In one example embodiment, the determining module 102 searches the telephone directory column 201 of the information matching table 200 to determine whether the phone number of the incoming call is recorded in the information matching table 200.

If the phone number of the incoming call is recorded in the telephone directory column 201, the timing module 103 counts a time period between a time when the incoming call is received and a time when the incoming call is terminated without being answered.

The analyzing module 104 analyzes the predetermined messages recorded in the information matching table 200 according to the phone number of the incoming call and the time period to determine a prompt message. In an example embodiment, the analyzing module 104 locates a number row in which the phone number of the incoming call is recorded in the telephone directory column 201 of the information matching table 200, and determines all time rows corresponding to the number row in the time column 202. Then, the analyzing module 104 determines an appropriate time row from the time rows corresponding to the number row according to the time period, and determines a predetermined message recorded in a message row of the message column 203 corresponding to the determined time row as the prompt message. The analyzing method of the predetermined messages is not limited to the manner described above, in another example embodiment, additional steps can be added to the analyzing method, others deleted, and the ordering of the steps of the analyzing method can be changed depending on the example embodiment.

The prompting module 105 prompts a user using the determined prompt message. In one example embodiment, the prompting module 105 can prompt a user by displaying the prompt message in the display screen 13. In another example embodiment, the prompting module 105 can prompt a user by playing the message using the speaker 14.

Figure 3:
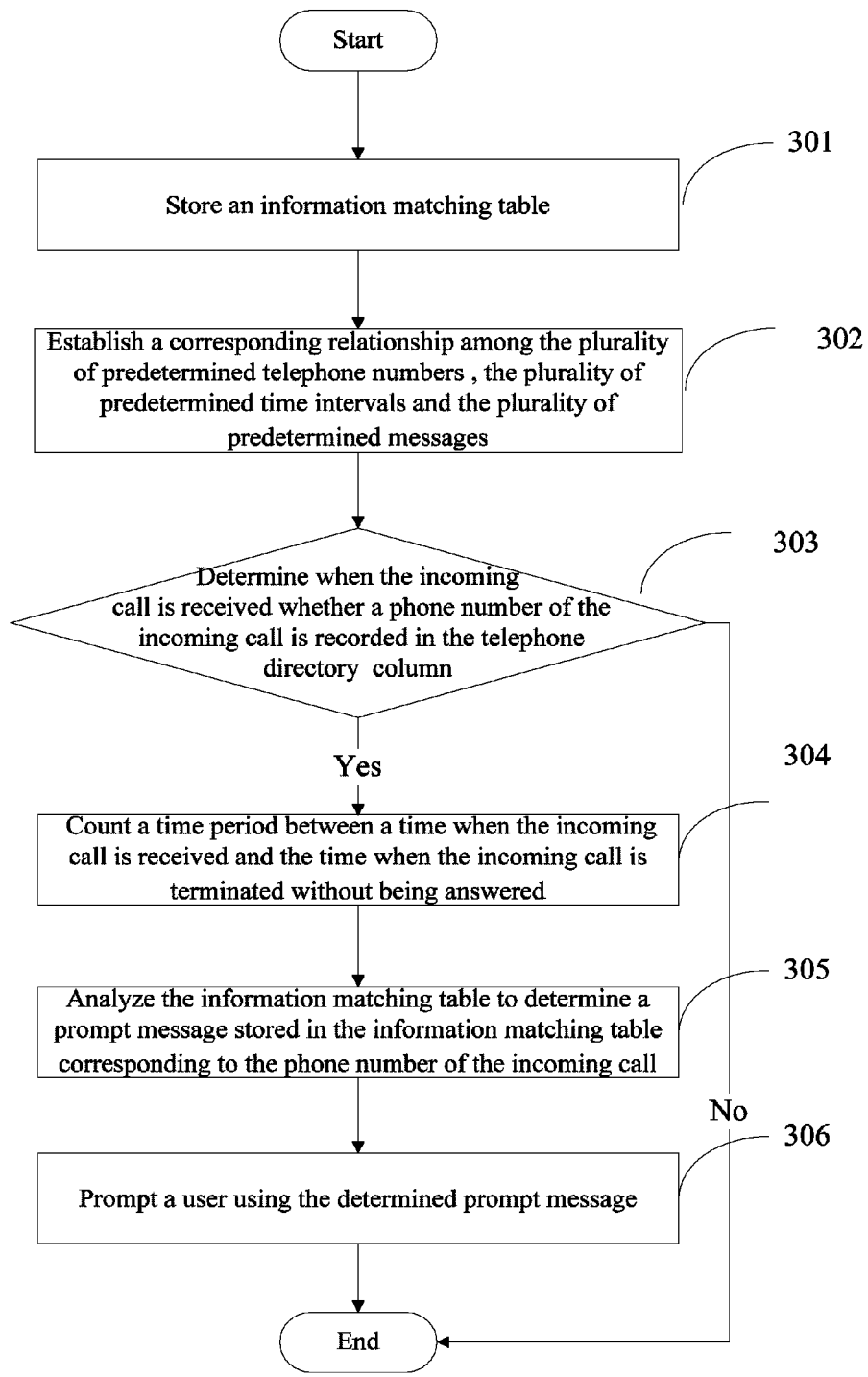
FIG. 3 is a flowchart of a message transmitting method according to an example embodiment of the present disclosure.

FIG. 3 is a flowchart of a message transmitting method for the communication device 100 according to one example embodiment. The message transmitting method includes the following steps, but additional steps can be added, others deleted, and the ordering of the steps can be changed depending on the example embodiment.

In step 301, the storing module 101 stores an information matching table 200.

In step 302, the storing module 101 establishes a corresponding relationship among the plurality of predetermined telephone number, the plurality of time intervals and the plurality of predetermined messages in the information matching table 200.

In step 303, determining module 102 determines when the incoming call is received whether a phone number of the incoming call is recorded in the telephone directory column 201 of the matching information table 200. If the phone number of the incoming call is recorded in the information matching table 200, the process goes to step 304. If the phone number of the incoming call is not recorded in the information matching table 200, the process goes to end.

In step 304, the timing module 103 counts a time period between a time when the incoming call is received and a time when the incoming call is terminated without being answered. In one example, the operator of termination to the incoming call can be the caller who makes the incoming call.

In step 305, The analyzing module 104 analyzes the predetermined messages recorded in the information matching table 200 corresponding to the phone number of the incoming call and the time period to determine a prompt message.

In step 306, the prompting module 105 prompts a user using the determined prompt message. In one example embodiment, the prompting module 105 can prompt a user by displaying the prompt message in the display screen 13. In another example embodiment, the prompting module 105 can prompt a user by playing the message using the speaker 14.

Communication device 100 and the message transmitting method can transmit the message to the recipient free of charge by setting the information table 200 in advance. When an incoming call is detected and the incoming call is terminated without being answered, the communication device 100 activates the automatic message displaying function or the automatic message broadcasting function according to a phone number of the incoming call and a time period, and the prompt message can be prompted to the recipient, saving the message charge.

Although certain example embodiments of the present disclosure have been specifically described, the present disclosure is not to be construed as being limited thereto. Various changes or modifications can be made to the present disclosure without departing from the scope and spirit of the present disclosure.

What is claimed is:

1. A communication device, comprising: a non-transitory storage device; a processor; and one or more programs executed by the processor to perform a message transmitting method, the method comprising: storing an information matching table comprising a telephone directory column recording a plurality of predetermined telephone numbers and a message column recording a plurality of predetermined messages; establishing a corresponding relationship between the plurality of predetermined telephone numbers and the plurality of predetermined messages; determining when the incoming call is received whether a phone number of the incoming call is recorded in the telephone directory column of the matching information table; analyzing the information matching table to determine a prompt message stored in the information matching table corresponding to the phone number of the incoming call; and prompting a user using the determined prompt message;

wherein the information matching table further comprises a time column, wherein the time column comprising recording a plurality of predetermined time intervals; and establishing a corresponding relationship among the plurality of predetermined telephone numbers, the plurality of predetermined time intervals and the plurality of predetermined messages;

wherein the corresponding relationship is defined as that each predetermined telephone number corresponding to at least one of the plurality of time intervals and each time interval corresponding to one of the plurality of predetermined messages;

wherein the method further comprises: counting a time period between a time when the incoming call is received and a time when the incoming call is terminated without being answered;

wherein the method further comprises: analyzing the predetermined messages to determine a prompt message corresponding to the time intervals that the time period is within.

2. The communication device of claim 1, wherein the corresponding relationship is defined as that each of the predetermined telephone numbers corresponding to one of the plurality of predetermined messages in the information matching table.

3. The communication device of claim 1, wherein the method further comprises: counting a time period between a time when the incoming call is received and a time when the incoming call is terminated without being answered.

4. The communication device of claim 3, wherein the method further comprises: analyzing the predetermined messages to determine a prompt message corresponding to the time intervals that the time period is within.

5. The communication device of claim 1, wherein the communication device further comprises a display screen to display the prompt message.

6. The communication device of claim 1, wherein the communication device further comprises a speaker to play the prompt message.

7. A message transmitting method of a communication device, the method comprising: storing an information matching table comprising a telephone directory column recording a plurality of predetermined telephone numbers and a message column recording a plurality of predetermined messages; establishing a corresponding relationship between the plurality of predetermined telephone numbers and the plurality of predetermined messages; determining when the incoming call is received whether a phone number of the incoming call is recorded in the telephone directory column of the matching information table; analyzing the information matching table to determine a prompt message stored in the information matching table corresponding to the phone number of the incoming call; and prompting a user using the determined prompt message;

wherein the information matching table further comprises a time column recording a plurality of predetermined time intervals, to establish a corresponding relationship among the plurality of predetermined telephone numbers, the plurality of predetermined time intervals and the plurality of predetermined messages;

wherein the corresponding relationship is defined as that each predetermined telephone number corresponding to at least one of the plurality of time intervals and each time interval corresponding to one of the plurality of predetermined messages in the information matching table;

counting a time period between a time when the incoming call is received and a time when the incoming call is terminated without being answered; and analyzing the predetermined messages to determine a prompt message corresponding to the time intervals that the time period is within.

8. The method of claim 7, wherein the corresponding relationship is defined as that each of the predetermined telephone numbers corresponding to one of the plurality of predetermined messages in the information matching table.

9. The method of claim 7, further comprising: counting a time period between a time when the incoming call is received and a time when the incoming call is terminated without being answered.

10. The method of claim 9, further comprising: analyzing the predetermined messages to determine a prompt message corresponding to the time intervals that the time period is within.

11. The method of claim 7, wherein the communication device comprises a display screen to display the prompt message, and the step of prompting a user using the determined prompt message comprises displaying the prompt message in the display screen.

12. A communication device, comprising: a storing module storing an information matching table comprising a telephone directory column recording a plurality of predetermined telephone numbers and a message column recording a plurality of predetermined messages and establishing a corresponding relationship between the plurality of predetermined telephone numbers and the plurality of predetermined messages; a determining module determining when the incoming call is received whether a phone number of the incoming call is recorded in the telephone directory column of the matching information table; an analyzing module analyzing the information matching table to determine a prompt message stored in the information matching table corresponding to the phone number of the incoming call; and a prompting module prompting a user using the determined prompt message;

wherein the information matching table further comprises a time column recording a plurality of predetermined time intervals, to establish a corresponding relationship among the plurality of predetermined telephone numbers, the plurality of predetermined time intervals and the plurality of predetermined messages;

wherein the corresponding relationship is defined as that each predetermined telephone number corresponding to at least one of the plurality of time intervals and each time interval corresponding to one of the plurality of predetermined messages in the information matching table;

counting a time period between a time when the incoming call is received and a time when the incoming call is terminated without being answered; and analyzing the predetermined messages to determine a prompt message corresponding to the time intervals that the time period is within.

* * * * *